UNITED STATES PATENT OFFICE.

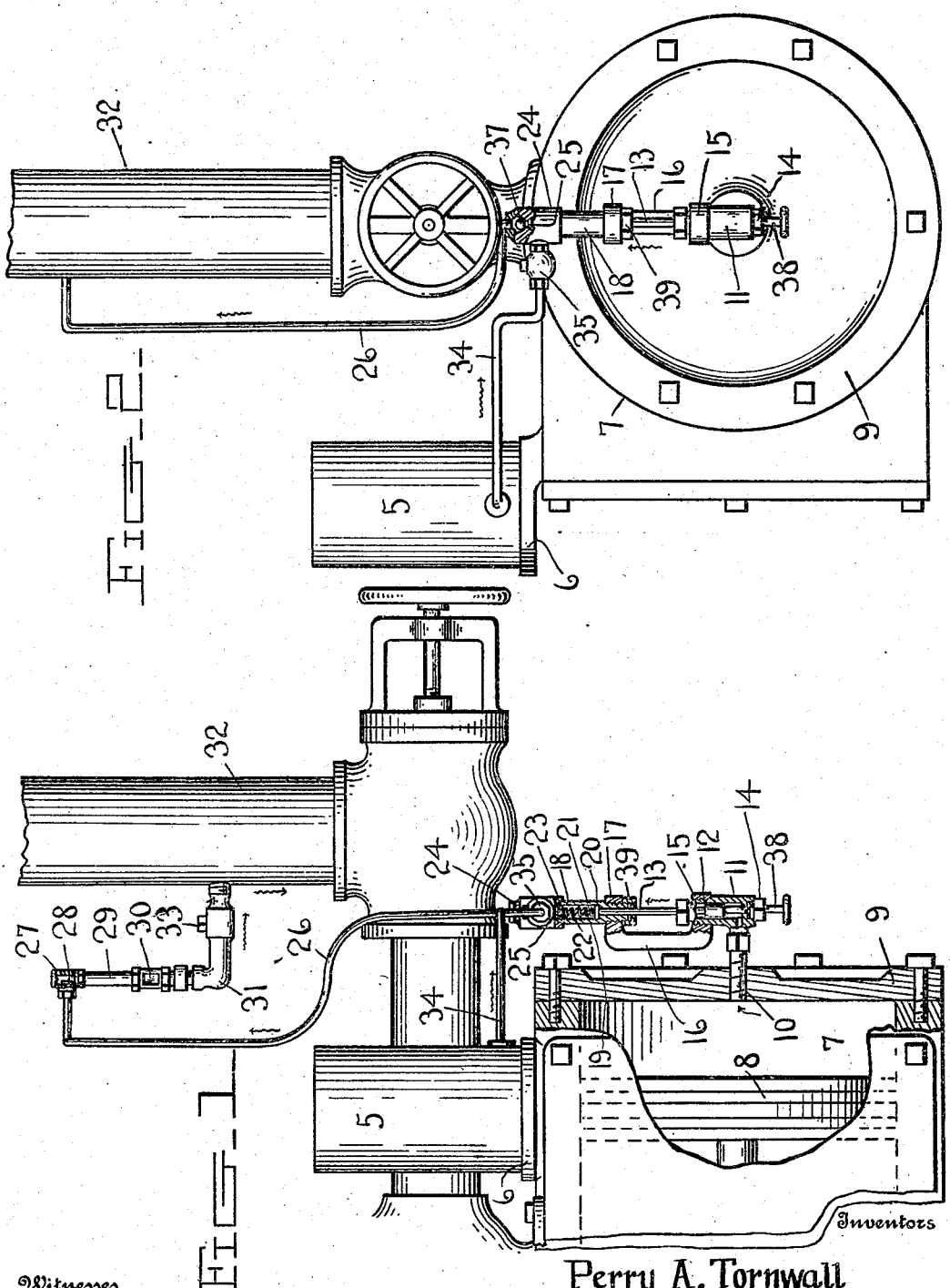

PERRY A. TORNWALL AND ELMER E. DARROW, OF HOUSTON, MISSISSIPPI.

AUTOMATIC OILING-PUMP.

937,488.  Specification of Letters Patent.  Patented Oct. 19, 1909.

Application filed November 9, 1908. Serial No. 461,814.

*To all whom it may concern:*

Be it known that we, PERRY A. TORNWALL and ELMER E. DARROW, citizens of the United States, residing at Houston, in the county of Chickasaw, State of Mississippi, have invented certain new and useful Improvements in Automatic Oiling-Pumps; and we do hereby declare the following to be a full, clear, and exact description of the invention, such as will enable others skilled in the art to which it appertains to make and use the same.

The invention relates to an automatic oiling pump or lubricator for steam or other engines and pumps.

The primary object of the invention is the provision of an automatic oiling pump or lubricator in which a piston is actuated by the pressure of fluid in the main cylinder of an engine or the like to force oil or lubricant into the main fluid supply pipe where the said oil or lubricant is conveyed to the main cylinder of the engine or the like for lubricating the operating parts thereof.

Another object of the invention is the provision of an automatic oiling pump or lubricator for engines or the like in which the piston of the lubricator is forced in an opposite direction after being actuated by a resetting spring upon the exhaust of the fluid from the main cylinder of the engine or the like, and means for regulating the movement of the said piston to effect the proper forced feed of the lubricant adapted to be fed into the main supply pipe leading to the cylinder of the engine or the like.

Another object of the invention is the provision of an automatic oiling pump or lubricator which is simple in construction, thoroughly efficient in operation, cheap and inexpensive in the manufacture.

In the drawings accompanying and forming part of this specification is illustrated the preferred form of embodiment of the invention which to enable those skilled in the art to practice the invention will be set forth at length in the following description, while the novelty of the invention will be brought out in the claims succeeding the description. It may be found expedient to change and modify the details of the invention and this may be done as within the scope of the appended claims without departing from the spirit of the invention.

In the drawings:—Figure 1 is a view with the engine partly in section as well as a greater portion of the invention applied thereto. Fig. 2 is a rear elevation of the engine with the invention mounted thereon.

Similar reference characters indicate corresponding parts throughout the views in the drawings.

In the drawings, the numeral 5 designates an oil reservoir or receptacle mounted upon a suitable support 6 secured to the outside face of a cylinder 7 of the conventional form of steam engine and in this main cylinder works a main piston 8 the same also being of the usual construction in use with the ordinary form of steam engine. Threaded centrally into the head 9 of the main cylinder 7 and forming communication therewith, is an elbow tube or pipe 10, the vertical portion of which forms a working cylinder or chamber 11 for the lower end 12 of a pumping piston 13 and which chamber 11 is provided with a packing gland 14, and in threaded engagement with the vertical portion of the elbow pipe 10 is the lower collar terminal 15 of a bracket 16, which has its upper terminal formed with a collar 17 into which is threaded the lower end of a pipe section 18, the latter being in alinement with the vertical portion of the elbow pipe 10 and which pipe section 18 is formed with a chamber or cylinder 19, in which works the upper headed end 20 of the piston 13, and rising from the headed end 20 of the said piston is a centering lug 21 engaged by the lower end of a coiled resetting spring 22, the opposite end of which has its bearing against a seat 23 at the point of juncture of the upper threaded end of the pipe section 18 with a coupling casting 24, which latter has a central passage 25 in communication with a supply pipe or tube 26 through which oil is lifted and adapted to pass from the oil reservoir.

The upper end of the supply pipe or tube 26 is threaded into a check valve casting 27 the latter containing the usual flap check valve 28 and depending from the valve casting 27 is a drip pipe or tube 29 formed with a sight section 30 the latter in communication with a pipe or tube 31 threaded into and in communication with a main steam supply pipe 32 leading to the steam chest of the main cylinder 7 of the engine. The pipe or tube 31 is formed with a turning plug valve 33 the latter adapted to control the supply through this pipe or tube 31 into the main steam supply pipe.

Leading from the oil reservoir 5 and in communication therewith is an oil feed pipe 34 the latter also in communication with a check valve extension 35 formed on the casting 24 and contained within the said extension 35 is the ordinary ball check valve to interrupt the feed of oil from the oil reservoir 5 into the passage 25 communicating with the supply pipe or tube 26 which latter is controlled by a ball check valve 37 contained within the casting 24 to prevent the back flow of oil supplied from the oil reservoir after entering said supply pipe or tube.

Mounted in the elbow pipe 10 is a crank actuated regulating stem or rod 38 the latter adapted to regulate or limit the throw of the lower end 12 of the piston 13 of the oil pump. Threaded on the lower end of the pipe section 18 is a packing gland 39 the latter surrounding the piston 13 at that portion working in the said pipe section so as to prevent the escape of oil when fed from the oil reservoir.

When steam is introduced into the main cylinder of the engine 7 in advance of the piston 8, the force of the pressure of steam extends or is communicated through the elbow pipe 10 to the lower end 12 of the piston 13 thereby necessarily raising the said piston 13 against the resistance of the resetting spring 22 into the chamber 19 of the pipe section 18; thereupon oil or lubricant is forced from the oil reservoir 5 through the supply pipe 26 thence through the drip tube 29 into the main steam supply pipe 32 leading to the main cylinder 7 of the engine where the oil is utilized for lubricating purposes. The oil is prevented from returning through the supply pipe 26 by the check valves 28 and 37 respectively when the piston 13 recedes by the action of the resetting spring 22 and upon the release of steam through the exhaust port of the engine in the main cylinder thereof.

What is claimed is—

1. In an automatic oil pump, the combination with a main cylinder and its piston, of an elbow pipe mounted in the head of said cylinder for communication therewith, a bracket connected to said elbow pipe, a pipe section connected to the bracket, a pumping piston having opposite ends working in the pipe section and elbow pipe respectively, an oil reservoir, a feed pipe between said oil reservoir and the pipe section, a supply pipe leading from the pipe section and in communication with the main supply pipe to the cylinder, check valves to prevent back flow of oil in the supply and feed pipes, and a resetting spring acting upon the pump piston.

2. In an automatic oil pump, the combination with a main cylinder and its piston, of an elbow pipe mounted in the head of said cylinder for communication therewith, a bracket connected to said elbow pipe, a pipe section connected to the bracket, a pumping piston having opposite ends working in the pipe section and elbow pipe respectively, an oil reservoir, a feed pipe between said oil reservoir and the pipe section, a supply pipe leading from the pipe section and in communication with the main supply pipe to the cylinder, check valves to prevent back flow of oil in the supply and feed pipes, a resetting spring acting upon the pump piston, and manually operable means mounted in the elbow pipe to regulate the throw of the pump piston.

In testimony whereof, we affix our signatures, in presence of two witnesses.

PERRY A. TORNWALL.
ELMER E. DARROW.

Witnesses:
   J. S. WILLIAMS,
   WALTER E. SCOTT.